United States Patent [19]

Rinchak

[11] Patent Number: 5,112,067
[45] Date of Patent: May 12, 1992

[54] UNIVERSALLY ADAPTABLE BOREGRINDING CHUCK ASSEMBLY

[76] Inventor: Albert D. Rinchak, 106 Pear Ct., Hebron, Ind. 46341

[21] Appl. No.: 701,035

[22] Filed: May 16, 1991

[51] Int. Cl.⁵ ............................................. B23B 31/10
[52] U.S. Cl. .................................. 279/151; 279/123; 279/111
[58] Field of Search .................... 279/1.5 J, 123; 269/110, 111, 266, 270, 275

[56] References Cited

U.S. PATENT DOCUMENTS

| | | | |
|---|---|---|---|
| 1,723,356 | 8/1929 | Knowles | 279/110 |
| 2,921,796 | 1/1960 | Ernest | 279/110 |
| 3,659,864 | 5/1972 | Blattry | 279/110 |
| 3,747,945 | 7/1973 | Bailiff | 279/110 |
| 4,706,973 | 11/1987 | Covarrubias et al. | 279/1.5 J |
| 4,772,034 | 9/1988 | Brown | 279/1.5 J |

*Primary Examiner*—Steven C. Bishop
*Attorney, Agent, or Firm*—Terry M. Gernstein

[57] ABSTRACT

A boregrinding chuck assembly includes a plurality of arrow-shaped jaws that each includes a head that is in the shape of an isosceles triangle with the apex angle thereof just slightly less than 360° divided by the total number of jaws in the assembly so that there is a small gap defined between adjacent jaws when such jaws are holding a workpiece in position for a boregrinding operation. Each jaw includes a set of marking lines that are located to define a workpiece-engaging circle that has a diameter just slightly smaller than the outer diameter of the workpiece to securely hold such workpiece when all of the jaws are engaged against the workpiece. The jaws are customized by cutting the heads along the marking lines that are appropriate to the particular workpiece.

9 Claims, 3 Drawing Sheets

UNIVERSALLY ADAPTABLE BOREGRINDING CHUCK ASSEMBLY

TECHNICAL FIELD OF THE INVENTION

The present invention relates to the general art of grinding and turning, and to the particular field of boregrinding. Specifically, the present invention relates to tools associated with boregrinding.

BACKGROUND OF THE INVENTION

Boregrinding is an operation in which excess internal stock is removed from a tubular workpiece. This process generally involves clamping the tubular workpiece on a boregrinding machine, and then operating on that clamped workpiece.

In the past, workpieces have generally been clamped by jaws that are engaged against the outer surface of the workpiece while being attached to the boregrinding chuck. The jaws can be machined to size or manufactured to size. If the jaws are to be used on a plurality of different sized workpieces, they must be cut to size each time.

This procedure causes many problems. First, the machinist must estimate the size of the jaw that will be required, and then remove the proper amount of material from the existing jaw. In the present environment that requires extremely accurate machining of bores, especially in the ball bearing art, such estimation is simply not precise and accurate enough. Jaws machined in this manner may create non-circular and deformed workpieces. At the least, such jaws might produce a workpiece that is out of tolerance limits at least in some areas of its perimeter.

Second, the prior jaws used in the boregrinding field have contacted the workpiece at a small area, nearly point contact in fact. Such point contact has created problems known as "six point" in which the workpiece is deformed by contact with the point sized jaw. At the very least, such point contact may produce a deformed, non-circular outer perimeter for the workpiece.

It is noted that this point contact has created other problems as well as the above-mentioned problems when determining how much "pinch" must be used. "Pinch" is defined as that amount of size difference required between the jaws inner diameter and the outer diameter of the workpiece so that there is sufficient frictional engagement between the jaws and the workpiece to hold that workpiece securely enough to perform the boregrinding operation. To illustrate, if the outer diameter of the workpiece is 2", a pinch of 1/64" will cause the inner diameter of the jaws to be (2"-1/128") so that the workpiece-engaging circle defined by the inner, workpiece-engaging surface of the jaws will be less than 2" in diameter. This smaller diameter will "pinch" the workpiece and thus hold it in position during the boregrinding operation.

However, if the contact between the jaws and the workpiece is of a small area, i.e., a point contact, the pinch must be extremely high since the force applied to the workpiece is a function of the area of contact, and such area is small for the point contact. This high pinch tends to exacerbate the deforming influences of the jaws even more than the point contact itself. Thus, the point contact elements of the prior art tend to cause a deformation of the workpiece for several reasons.

Accordingly, there is a need for a boregrinding chuck assembly which includes jaws that can be customized to precise and accurate sizes and which will not tend to deform the outer perimeter of the workpiece during a boregrinding operation.

Still further, in addition to the above-discussed shortcomings, the prior art boregrinding jaws are not amenable to easy and expeditious customizing. Therefore, there is a further need for a boregrinding chuck assembly that can be easily and expeditiously customized while still overcoming the above-discussed problems associated with the prior art.

OBJECTS OF THE INVENTION

It is a main object of the present invention to provide a boregrinding chuck assembly which will securely support a workpiece during a boregrinding operation; yet will not tend to deform such workpiece.

It is another object of the present invention to provide a boregrinding chuck assembly which can be accurately and precisely customized.

It is another object of the present invention to provide a boregrinding chuck assembly which can be accurately and precisely customized while essentially completely eliminating any guesswork associated with such customizing.

SUMMARY OF THE INVENTION

These, and other, objects are achieved by a boregrinding chuck assembly that includes a plurality of arrow-shaped work-holding jaws that are shaped to engage a workpiece outer surface over a substantial portion of that outer surface and which are shaped and sized to be easily and expeditiously customized. The jaws also include guide means so that any customizing is carried out accurately and precisely.

More specifically, a preferred embodiment of the assembly includes six jaws, with each workpiece-holding jaw including a head that is in the form of an isosceles triangle with the apex angle thereof being less than 60°, and preferably about 50°, so that the apex portion of the head will engage the workpiece over an arc that is slightly less than one-sixth of the total circumferential perimeter of the workpiece. The head of each jaw also includes guide lines thereon indicating the outer diameter of the workpiece to be used in association with such guide line so that the head can be machined to the proper dimension to securely hold a workpiece during a boregrinding operation. The guide lines have curvatures that match the outer surface curvature of the workpiece at the size associated with each guide line so that a flush and continuous fit is established between each jaw and the outer surface of the workpiece at all selected sizes of the jaws. A continuous fit is essential if deformation of the workpiece caused by the supporting means is to be avoided.

By having the jaw heads in the shapes of isosceles triangles having an apex angles of about 50°, as the heads are machined, the jaws will engage a substantial portion of the outer circumferential perimeter of the workpiece no matter what outer diameter is selected, yet adjacent heads will not be so close as to become disoriented due to debris or the like becoming jammed between adjacent jaw heads. The gap between each head will be sufficiently large to permit such debris to fall away from between such adjacent heads, yet will not be so large as to cause a deformation of the workpiece due to a wide spacing between supporting contact locations.

The jaws are customized by simply machining away an appropriate part of the heads in accordance with the size of the workpiece. The guidelines are placed to produce the proper amount of pinch when the head is ground to the exact guide line. The amount of pinch is selected as a function of the amount of circumferential area covered by the heads to produce a holding force that is sufficient to securely hold the workpiece during the boregrinding operation yet which is not so large as to cause deformation of the workpiece.

DETAILED DESCRIPTION OF THE PREFERRED EMBODIMENT OF THE INVENTION

Figure 1:
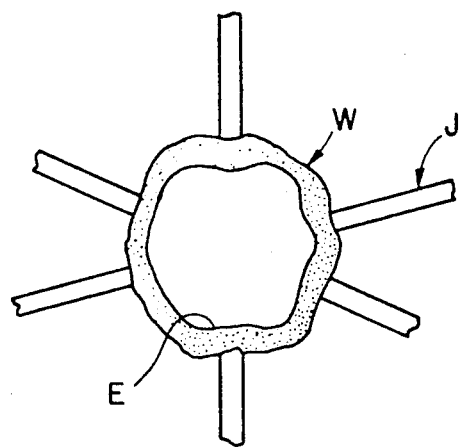
FIG. 1 is a schematic of a prior art boregrinding chuck assembly in which six jaws engage a workpiece, and indicates a deformation of such workpiece.

Shown in FIG. 1 is a prior art boregrinding set up in which a tubular workpiece W is held in place for a boregrinding operation by a plurality of workpiece-holding jaws, such as jaw J. Each of the jaws includes a workpiece-engaging edge E that engages the outer surface of the workpiece with sufficient frictional force to hold the workpiece in place during a boregrinding operation.

Since force is equal to area time pressure, the pressure with which the jaws must engage the workpiece is an inverse function of the area of the surface of the jaw that engages the workpiece.

As shown in FIG. 1, the edges E of the jaws J are quite small, and thus the pressure associated with those jaws must be quite high. Still further, the small surface area associated with each edge E tends to cause a deformation of the outer perimeter of the workpiece. Thus, the large pressures associated with the jaws J as well as the small areas associated with such edges tends to deform the outer circumferential shape of the workpiece in the manner indicated in FIG. 1. Such deformation is known as "six point".

Figure 2:
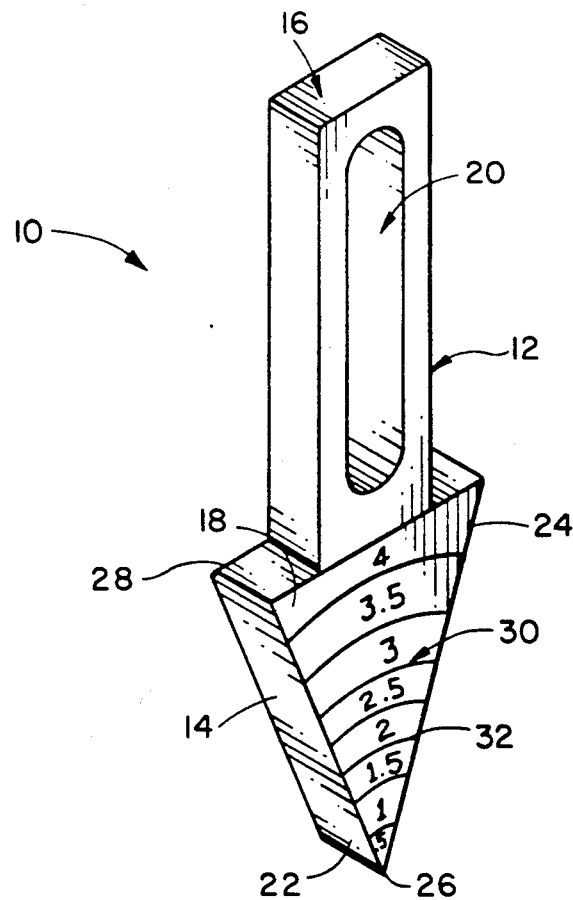
FIG. 2 is a perspective view of a workpiece-holding jaw embodying the present invention.

Referring next to FIG. 2, a workpiece-holding jaw 10 of the present invention is shown. The jaw 10 is preferably monolithic, but can include a plurality of attached parts if suitable, and includes a rectangular body 12 and a triangular head 14. The jaw 10 can be formed of any suitable material, such as steel or the like.

The body 12 includes a distal end 16 and a proximal end 18 and an elongated slot 20 which is adapted to receive an appropriate fastening means to attach the jaw to a boregrinding chuck.

The jaw head 14 is in the shape of an isosceles triangle having equal legs 22 and 24 intersecting each other at an apex 26 and a base 28 formed opposite to such apex, with the base 28 being connected to the proximal end 18 of the body 12. The thus-connected head and body form an arrow shape.

The head 14 is shaped so that a plurality of such jaws can be used to securely support a workpiece in place without creating a deformation of that workpiece. To this end, the jaw head 14 has an apex angle of just less than 360° divided by the number of jaws being used in the chuck assembly. For example, if there are to be six jaws used in a chuck assembly, the apex angle of each jaw head will be just less than 60° (360°/6). If the apex angle were exactly equal to this 360°/6 ratio, adjacent jaws would contact each other along legs 22 and 24 and debris might become jammed between such adjacent jaws thereby tending to disturb the proper orientation of the jaws with respect to the chuck assembly and/or with respect to the workpiece.

By having the apex angle slightly less than such ratio, there will be a small gap between adjacent jaws. Such gap will permit any debris to fall away and thus will not permit such debris to disturb the proper orientation of the jaws. However, by selecting an apex angle that is just less than the ratio of 360° to the number of jaws in the assembly, the portion of the head which engages the workpiece will cover an arc length that has a sufficiently large surface area to securely hold the workpiece in place during a boregrinding operation without significantly distorting that workpiece, and the gap defined between adjacent jaws will not be sufficiently large as to raise a possibility of creating a six-point type deformation of the workpiece due to a wide spacing of adjacent jaws.

For example, if there are six jaws, and each jaw includes a head apex angle of 50°, the total arc length covered by such jaws will be 300°, which is approximately 83% of the total circumferential surface area of the workpiece. The inventor has found that covering 83% of the circumferential surface area of the workpiece is sufficient to securely hold the workpiece, yet the apex angle of 50° is not so large as to move the adjacent legs of the jaw heads so close together as to create a substantial likelihood that debris will become jammed between adjacent jaws and thus disturb the orientation of such jaws. Such debris will fall through the small gap between adjacent jaws. The small gaps will be sized by dividing the difference between 100% and the coverage of the jaw workpiece-engaging surface by the total number of jaws in the assembly. For example, in the case of six jaws, the total coverage of the workpiece outer surface is, as above discussed, approximately 83%, so the small gaps will be approximately slightly less than 3% of the circumference of the workpiece [(100% −83%) /6].

In the case of an isosceles triangle having a 50° apex angle, the other angles are both 65°. Therefore, in the preferred embodiment shown in FIG. 2, the apex 26 forms an angle of 50°, and the intersection of legs 22 and 24 with the base 28 form equal anoles of 65° each.

As is also shown in FIG. 2, the jaw head 14 includes a guide means 30. The guide means is used to customize each jaw head according to the size of the workpiece, and can account for the amount of pinch needed to properly secure the workpiece. In this manner, the jaw head can be customized by cutting along the appropriate portion of the guide means and the amount of pinch that is proper for the chosen size will automatically be set. This will remove the non-uniform results associated with having a machinist estimate the location of a cut.

Of course, the machinist can still change the size of the head by cutting adjacent to one of the guide means portions if he so desires.

The guide means 30 includes a plurality of score lines, such as score line 32 associated with a workpiece having an outer diameter of 2". In place of the score lines, etched lines can be used. The score lines are arcuate so as to define a segment of a curve when the head is cut along such score line. The curvature associated with each score line will be set according to the diameter marked adjacent to such line. For example, the score line 32 has a curvature that corresponds to a circle having a diameter that is nearly 2", but is selected to hold a 2" workpiece with sufficient force to securely hold it in place during a boregrinding operation. The curvature of each of the score lines is selected so that when the jaw is cut at any score line, the jaw will have a curvature that will fit flush against the outer surface of the workpiece. By having such flush fit, the workpiece will be supported in a continuous manner by each jaw. If such curve were not flush, a size-point tape problem might result.

The score lines are spaced apart along the height dimension of the triangular head 14. Cutting the head along a score line will define an arc along that score line, with the arc having a length that will cover a selected portion of the workpiece outer circumferential surface, such as slightly less than 1/6$^{th}$ thereof in the case of six jaws. The arcuate score lines on all of the heads having the same dimension associated therewith all define a workpiece-engaging circle. Thus, all of the arcuate score lines marked 2", for example, will define a workpiece-engaging circle approximately 2" in diameter or less to define a proper pinch as above discussed.

Figure 3:
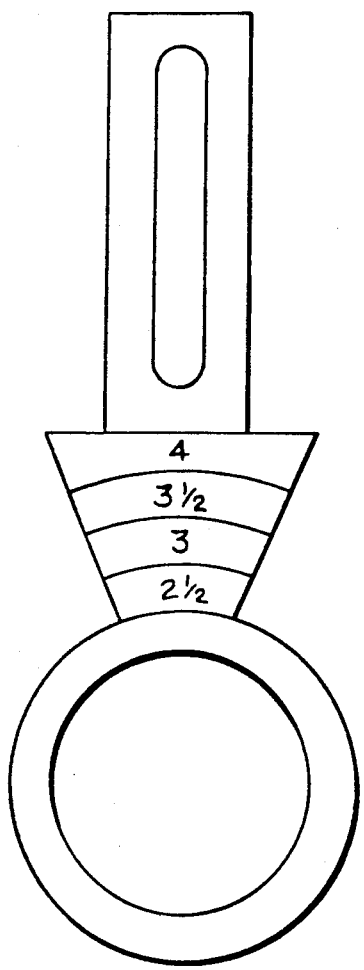
FIG. 3 is a plan view of the workpiece-holding jaw of the present invention engaging a workpiece having an outer diameter of 2.00".
Figure 4:
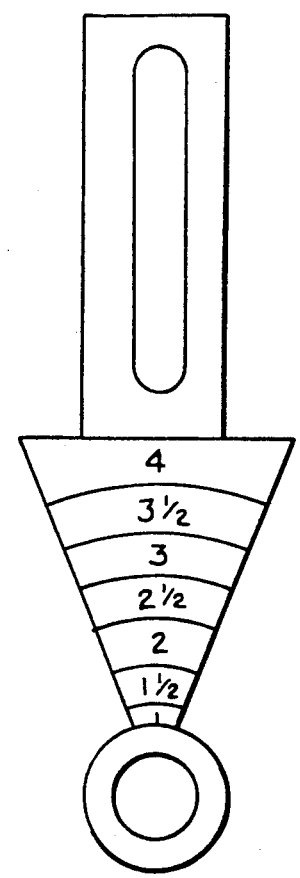
FIG. 4 is a plan view of the workpiece-holding jaw of the present invention engaging a workpiece having an outer diameter of 0.750".
Figure 5:
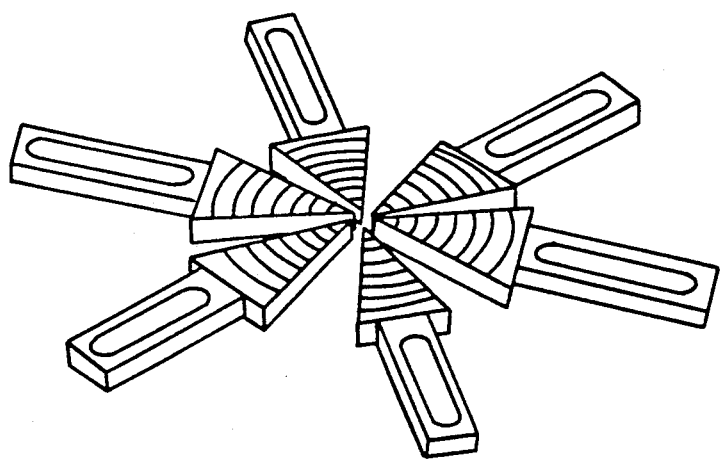
FIG. 5 is a perspective view of six workpiece-holding jaws arranged as they would be on a boregrinding chuck.

Each jaw is thus customized by simply cutting the head along the selected and appropriate score line. The thus customized jaw is mounted on the chuck assembly and engaged against the workpiece. Two such customized jaws are shown in FIGS. 3 and 4, with the jaw in FIG. 3 being customized to hold a 2" workpiece, and the jaw in FIG. 4 being customized to hold a 0.750" workpiece. The FIG. 3 and 4 jaws are associated with a six jaw assembly, such as indicated in FIG. 5. Appropriate changes will be made for an assembly having more or fewer jaws.

Figure 6:
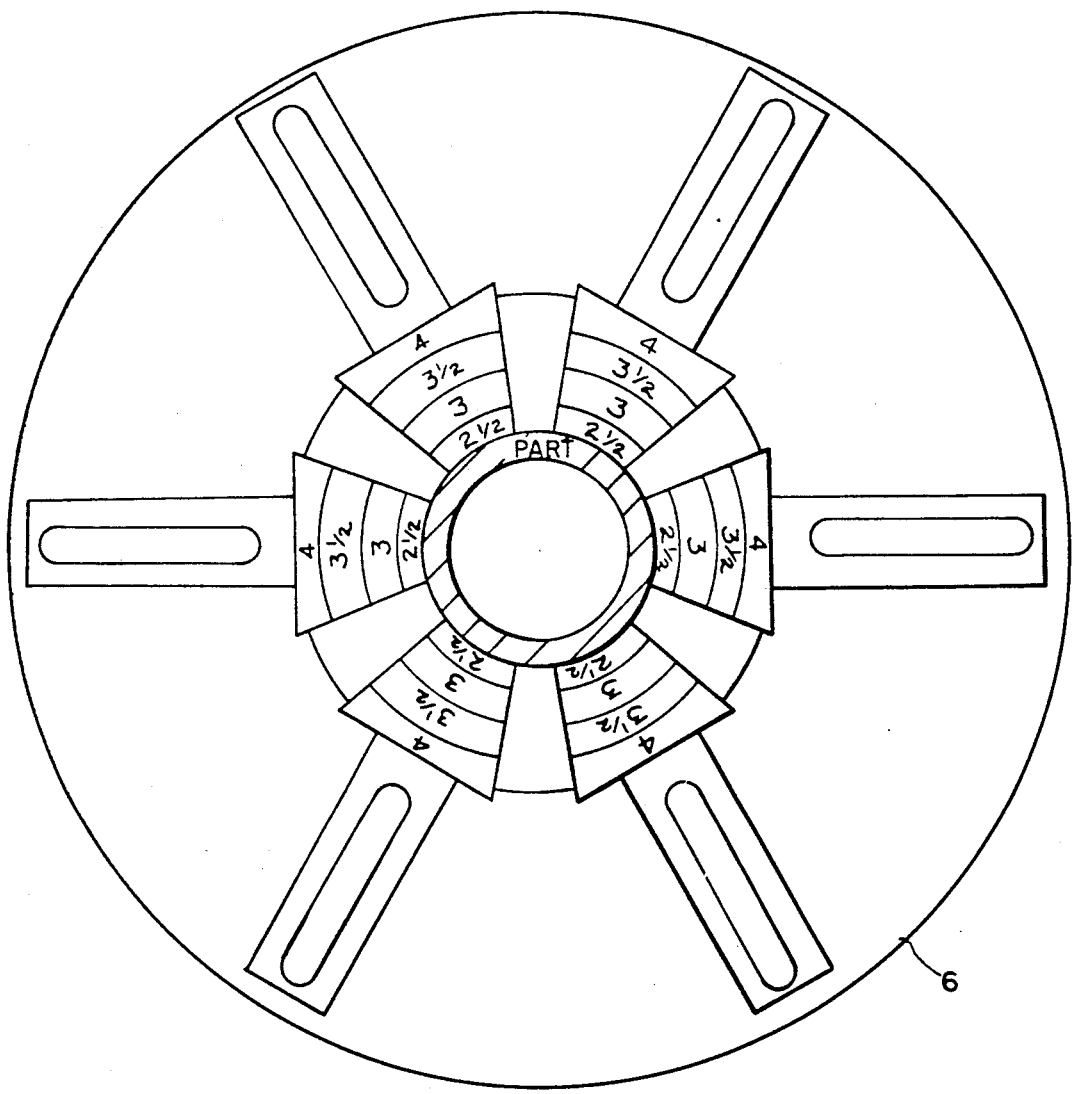
FIG. 6 is a plan view of a boregrinding chuck assembly having six workpiece-holding jaws engaging a workpiece and held on a boregrinding chuck.

The jaws are shown in place on a boregrinding chuck C in FIG. 6. The assembly shown in FIG. 6 includes six jaws which have been customized to hold a 2" workpiece W. The fastening means holding the jaws to the chuck have not been shown in FIG. 6 for the sake of more clearly showing the jaws and the chuck. However, any suitable fastening means, such as bolts, bolt assemblies, or the like can be used as will occur to those skilled in the art based on the teaching of the present disclosure, and the fastening means will contact the jaws adjacent to the slots 20.

Specifically, the jaws 10 can be used with a specific machine such as a Bryant/Centalign machine or the like.

It is to be understood that while certain forms of the present invention have been illustrated and described herein, it is not to be limited to the specific forms or arrangement of parts described and shown.

I claim:
1. A boregrinding chuck assembly comprising:
A) a boregrinding chuck for holding a tubular workpiece undergoing boregrinding;
B) a plurality of workpiece-holding jaws mounted on said boregrinding chuck, each jaw including
(1) a rectangular body having a distal end and a proximal end,
(2) a triangular head attached to said body proximal end, said head being in the shape of an isosceles triangle with the base thereof attached to said body proximal end and having an apex angle of 50° with the other two angles thereof each being 65° so that an arc length between any two corresponding points on the equal length legs of said triangular shaped head is slightly less than the total outer circumference of said workpiece divided by the total number of jaws so that there is only a small gap defined between adjacent jaws when all of said jaws are engaged against the workpiece and the curve of said arc length essentially matches the curve of the workpiece whereby said arc length will fit essentially flush against the workpiece during a boregrinding operation, and
(3) a guide means on said head for guiding a customizing operation of said head to fit a particular workpiece, said guide means including a plurality of arcuate lines on said head.
2. The boregrinding chuck assembly defined in claim 1 wherein said arcuate lines are spaced apart along the height dimension of said triangular head.
3. The boregrinding chuck assembly defined in claim 2 wherein said arcuate lines are spaced apart distances selected so that all corresponding arcuate lines of said jaws define a work-engaging circle connecting all of the jaws adjacent to the apex of each jaw which circle has a diameter that is slightly less than the diameter of the outer circumference of said workpiece.
4. The boregrinding chuck assembly defined in claim 3 wherein there are six jaws.
5. The boregrinding chuck assembly defined in claim 4 further including an elongate slot defined in each jaw body, and each jaw is attached to said chuck adjacent to said slot.
6. The boregrinding chuck assembly defined in claim 5 wherein said jaws are each monolithic.
7. The boregrinding chuck assembly defined in claim 6 wherein said small gap is less than approximately 3% of the total circumference of said workpiece.
8. A method of mounting a workpiece for a boregrinding operation using the boregrinding chuck assembly of claim 3 comprising:
A) cutting each jaw head along a selected one of said arcuate lines in accordance with the outer dimension of the workpiece; and
B) mounting said cut jaws on said boregrinding chuck in position so that each selected arcuate line is located to engage the outer surface of the workpiece to hold the workpiece in position during the boregrinding process.
9. A boregrinding chuck assembly comprising:
A) a boregrinding chuck for holding a tubular workpiece undergoing boregrinding;
B) a plurality of workpiece-holding jaws mounted on said boregrinding chuck, each jaw including
(1) a rectangular body having a distal end and a proximal end,
(2) a triangular head attached to said body proximal end, said head being in the shape of an isosceles triangle with the base thereof attached to said body proximal end and being shaped and sized so that an arc length between any two corresponding points on the equal length legs of said triangular shaped head is slightly less than the total outer circumference of said workpiece divided by the total number of jaws so that there is only a small gap defined between adjacent jaws when all of said jaws are engaged against the workpiece and the curve of said arc length essentially matches the curve of the workpiece whereby said arc length will fit essentially flush against the workpiece during a boregrinding operation, and (3) guide means on said head for guiding a customizing operation of said head to fit a particular workpiece, said guide means including a plurality of arcuate lines on said head.

* * * * *